Nov. 3, 1936.   A. PFAU   2,059,649
PRESSURE REGULATOR
Filed July 18, 1934   3 Sheets-Sheet 1

Fig. 1

Nov. 3, 1936.  A. PFAU  2,059,649
PRESSURE REGULATOR
Filed July 18, 1934  3 Sheets-Sheet 2

Patented Nov. 3, 1936

2,059,649

UNITED STATES PATENT OFFICE 2,059,649

PRESSURE REGULATOR

Arnold Pfau, Milwaukee, Wis., assignor to Allis-Chalmers Manufacturing Company, Milwaukee, Wis., a corporation of Delaware Application July 18, 1934, Serial No. 735,815

10 Claims. (Cl. 137—53)

This invention relates to improvements in control systems for hydraulic turbines and more particularly to means for preventing wide variations in the pressure of the fluid supplied to a turbine.

Some hydraulic turbines are supplied with operating fluid flowing through a pipe line or penstock under a predetermined hydraulic head. The fluid, being confined within the penstock, cannot dissipate any forces resulting from reduction or stopping of flow and such forces produce wide variations in penstock pressure which may be dangerous to both the penstock and the turbine. During operation of the turbine, it however becomes necessary to vary the quantity of fluid flowing therethrough and hence becomes necessary to vary the pressure in the penstock dependent on the prevailing conditions of operation. Variations in penstock pressure must be either taken up in a reservoir capable of receiving excessive flow of fluid upon reduction in quantity of fluid required and of supplying fluid when the quantity of fluid required is increased, or means must be provided to permit discharge of the excessive flow at least when the quantity required for operation of the turbine is suddenly decreased. Such reservoirs or so-called surge tanks are however impractical under some conditions and in some installations and other means for regulating the penstock pressure, such as a pressure relief valve, must therefore be provided. Such valves may be operable either synchronously with or relatively to the operation of the turbine gate and should be so constructed as to have entirely self contained operating mechanism which merely requires a control impulse to commence the operating action.

It is therefore among the objects of the present invention to provide a control system for hydraulic turbines in which a penstock pressure relief device is provided and is operable in response to a mere control impulse and without the supply of power thereto from an auxiliary or outside power device.

Another object of the invention is to provide a control system for hydraulic turbines in which a penstock pressure relief device is provided with means to secure positive opening or closing of the discharge opening from the penstock.

Another object of the invention is to provide a control system for hydraulic turbines in which a penstock pressure relief device is provided with means to prevent or retard movement of the turbine gate upon failure of the relief device to operate.

Another object of the invention is to provide a control system for hydraulic turbines in which a penstock pressure relief device is interconnected with the turbine gate control mechanism to secure either synchronous operation or relative operation of the gate and of the relief device.

Another object of the invention is to provide a control system for hydraulic turbines in which a penstock pressure relief valve is operable dependent on the rate of movement of the turbine gate.

Objects and advantages other than those above set forth will be apparent from the following description when read in connection with the accompanying drawings, in which.

Referring more particularly to the drawings by characters of reference, the reference numeral 16 generally designates a hydraulic turbine herein illustrated as being of the reaction type and as being supplied with operating fluid from a penstock (not shown) through a spiral casing 17 and discharging into a draft tube 18. Supply of fluid from the spiral casing 17 is controlled by a gate 19 composed of movable vanes 15 connected with a shifting ring 14 having an upward extension 21. The shaft 22 of the turbine herein illustrated is provided with a speed governor 20 of which the speed sensitive member comprises the flyballs 23 connected with a collar 24 which is movable in a vertical direction along the shaft 22 as the flyballs are thrown outwardly by centrifugal force or are drawn inwardly, due to the tension of the springs 18 connecting them, upon reduction of such force. Movement of the collar 24 causes rocking of a bell crank lever 26 mounted on a fixed pivot 12 and movably connected at one end thereof to a lever 27, the other end of which lever is also movable as will be described hereinafter. A rod 28 is movably connected with lever 27 and is connected through another bell crank lever 29 with the rod 10 of a pilot valve generally designated by 31. Valve 31 is supplied with a fluid from a source (not shown) under substantially constant pressure through a conduit 32 and controls the flow of fluid through conduits 33 and 34 to opposite sides of the piston of a fluid pressure operated servo motor 36. The piston rod 37 of the servo motor is movably connected through a link 38 with the shifting ring 14 and the lever 27 is also movably connected with the piston rod 37.

Figure 1:
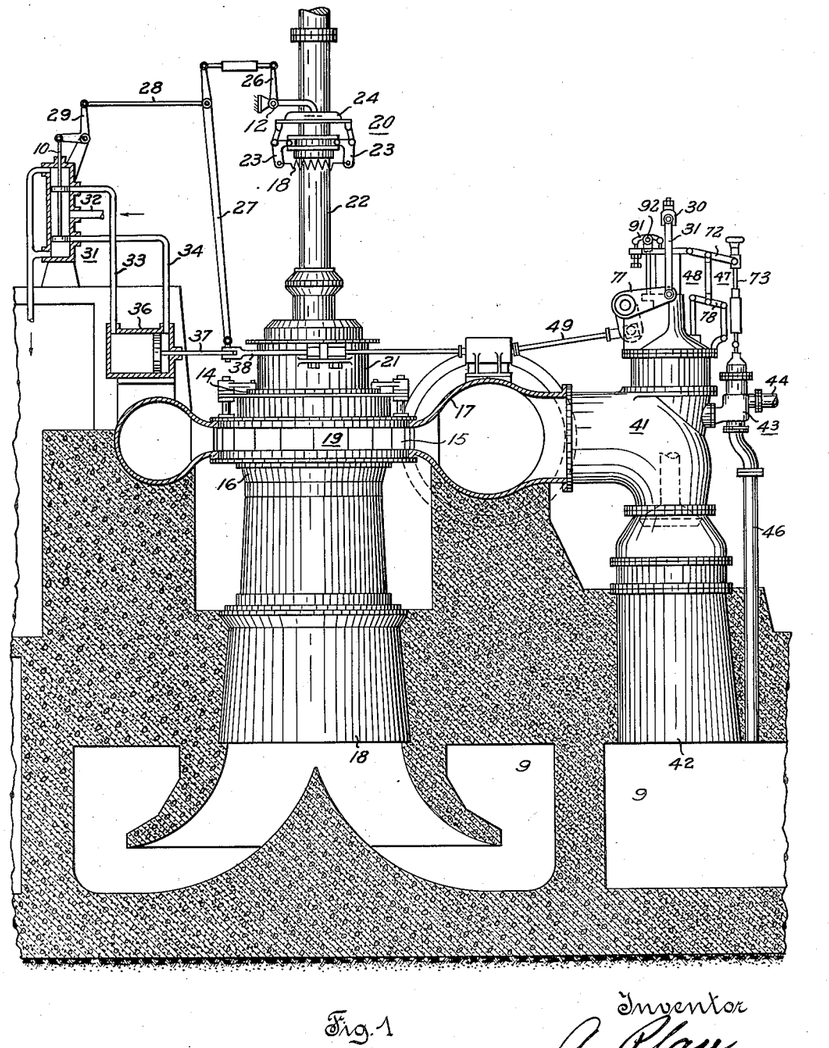
Fig. 1 is a somewhat schematic view of a hydraulic installation with a diagrammatic showing of the governor and the governor actuated control means by which the operation of the gate of the hydraulic turbine is controlled and with a diagrammatic illustration of the relation of the various elements of the penstock relief device or pressure regulator to the other structural elements comprising the installation.

When the turbine speed increases, flyballs 23 are forced outwardly and collar 24 is raised. Such action rocks lever 26 which acts through lever 27, rod 28 and lever 29 to shift the piston of valve 31 which changes the connections of the pressure source with the servo motor 36 and the servo motor moves shifting ring 14 to change the position of the vanes of the turbine gate 19 to thereby decrease the quantity of fluid passing into the turbine thus reducing the speed thereof. If the speed of the turbine is reduced rather than increased, the operation above described is reversed to increase the flow of fluid and thus to increase the turbine speed. Due to the fact that the above speed control is well known and does not form a novel feature of the present invention the control has been described only insofar as is required to permit complete comprehension of the present invention which is associated therewith. As shown in Fig. 1 of the drawings, the turbine is in operation and the gate 19 is entirely open.

When speed changes take place, pressure changes are produced in the penstock and an increase in the pressure due to closure of the gate 19 must be relieved by a pressure regulator which is essentially a relief valve generally designated at 41 and is connected between spiral casing 17 and a discharge conduit 42 adjacent to the draft tube 18. Valve 41 is herein shown as being of the type in which the flow of fluid therethrough is controlled by a substantially disk shaped valve body 51 operated by a piston 57 acting under fluid pressure. The admission of fluid pressure to the relief valve piston is controlled by a valve 43 connected with a source of fluid pressure, such as the penstock, by way of a conduit 44. Discharge from the piston of the relief valve is also controlled by valve 43 and such discharge flows through conduit 46 into the tailrace 9. Valve 43 is operable through a compensating device generally designated at 47 from a dashpot device generally designated at 48 which cooperates with a rod 49 connected with the shifting ring 14. Due to the connection of the pressure regulator with the shifting ring 14, the two portions of the structure may operate in synchronism, i. e. when ring 14 is shifted to close the gate 19, the relief valve is opened and vice versa or such portions of the structure may operate relative to each other as will be described hereinafter.

Figures 2, 3, 4:
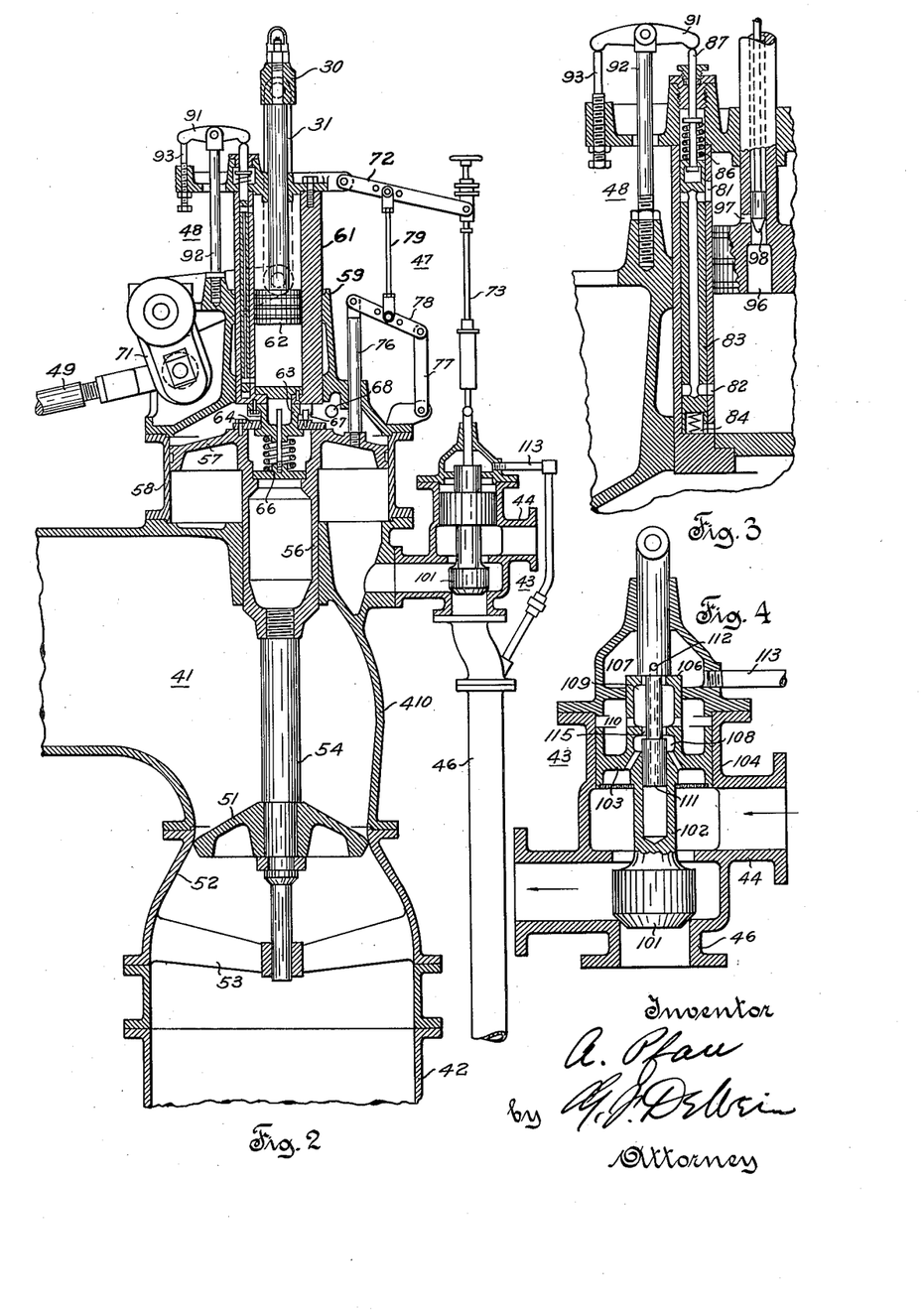
Fig. 2 is a vertical cross sectional view disclosing one embodiment of means for controlling pressure variations within a fluid supply line to a hydraulic turbine.
Fig. 3 is a partial enlarged detail view of the dashpot construction embodied in the structure illustrated in Fig. 2.
Fig. 4 is an enlarged vertical sectional detail view of a fluid pressure control valve as applied to the construction illustrated in Fig. 2.

In the detailed illustration of the pressure regulator, the regulator 41 comprises a valve 51 seating against the seat member 52 forming a portion of the discharge conduit. Movement of the valve body 51 is guided by a spider 53 within seat member 52 and in which an extension of the lower end of the valve stem 54 is movable. The upper end of the stem 54 is formed by a hollow extension 56 provided with a flange 57 forming a piston, the extension passing through the wall of the elbow forming a portion of the discharge conduit. The piston 57 operates in a cylinder 58 mounted on the discharge elbow and the cylinder has mounted on the upper end thereof an extension 59 which provides fixed pivoting points for other elements of the structure and which forms a guide for a movable cylinder 61 which together with the piston 62 and other portions hereafter to be described, forms a dashpot which is preferably filled with oil. A flanged extension 63 is suitably attached to the lower end of the cylinder 61 and engages an annular plate 64 suitably attached to the hollow extension 56 of the valve stem 54. The extension 63 is urged against the plate 64 by a compression spring 66 and may move against the spring force by an amount determined by the clearance between plate 64 and the flange 67 of extension 63. The extension 63 from the cylinder 61 and the spring 66 together with the plate 64 attached to the hollow portion of the valve stem 54 provide means for mechanically connecting the dashpot cylinder 61 and the piston rod 54 by a coupling which has a limited amount of axial clearance or free play. The upper portion of the cylinder 58 is provided with a drain 68 to permit the piston 57 to move freely in response to fluid pressure admitted by the control valve 43. The dashpot piston 62 is connected with the connecting rod 49 by way of a yoke 30, links 31 and a bell crank lever 71 mounted on the dashpot cylinder guide 59. The top of the dashpot cylinder is connected through a floating lever 72 and a rod 73 with the stem of the control valve 43 to operate the same as will be hereinafter described. Movement of the rod 73 is responsive to movement of the dashpot cylinder 61 and is relayed by the compensating device which comprises a rod 76 mounted on piston 57, a member 77 mounted on the dashpot cylinder guide 59, a lever 78 connecting the members 76 and 77 and a link 79 connecting the floating lever 72 and lever 78.

The construction of the dashpot device may be more clearly seen from the partial illustration thereof in enlarged detail in Fig. 3. The dashpot cylinder 61 is provided with a passageway around the piston formed through the wall thereof and communicating with the interior of the cylinder 61 by way of apertures 81 and 82 above and below the piston 62 respectively. Opening and closing of the apertures is controlled by a slide valve 83 in the form of a rod having a longitudinal central passageway therethrough with lateral ports to register with the apertures 81 and 82 in one position of the valve. The slide valve is urged upwardly to close aperture 82 by a spring 84 and the position of the valve in the bypass is determined by the compression of a spring 86 seated on a collar on a stem 87 movably connected with the slide valve 83 and extending out of the bypass passage through a suitable sealing gland. The end of the stem 87 contacts with one end of a rocker arm 91 movably mounted on a pivot 92. The other end of the rocker arm is positioned by an adjustable stop 93 mounted on the dashpot cylinder 61. Due to the adjustability of the position of the slide valve 83 in the bypass, it is possible to control the rate of movement of the dashpot in certain of the operations required from the regulator. The dashpot piston 62 is formed with a passageway 96 therethrough and the passageway 96 is in communication by way of an aperture 97 with the space above the piston. The free area of the aperture 97 is controlled by a needle valve 98 extending through the hollow piston rod and adjustable therein by any suitable means mounted on the upper end of the piston rod.

The enlarged sectional detail view of the control valve 43, as shown in Fig. 4, discloses the construction of the valve and the connections for the supply to and the discharge of fluid pressure from the under surface of the piston 57 by way of the conduits 44 and 46 respectively. A valve body 101 controls both the admission of fluid through the conduit 44 and the discharge therethrough the conduit 46. The valve stem 102 is hollow and is provided with a flanged portion 103 operating as a piston in a cylindrical portion of the valve casing 104. The portion of the stem 102 immediately above the upper surface of the piston 103 is enlarged and forms a piston surface 106 extending into a chamber 107. The interior of the enlarged portion of the stem is substantially divided into two chambers 108 and 109 which are connected by apertures with the spaces above and below the piston 103, the space above the piston being designated by the numeral 110. The flow of fluid pressure between the chambers 108 and 109 and hence between the upper and lower surfaces of the piston 103 is controlled by a valve member 111 which has a stem extending up through the valve casing and which is connected with the push rod 73. Valve member 111 is itself provided with a passageway 112 therethrough. Chamber 107 is connected with the discharge conduit 46 by way of a conduit 113.

Assuming that the turbine gates are fully opened and that the several elements of the pressure regulator are therefore in the positions shown, the operation of the embodiment illustrated in Figs. 2, 3, and 4 will now be described relative to the several conditions met in operation of the turbine. When the turbine gates are slowly closed, the push rod 49 moves toward the left and the bell crank 71 exerts a downward force on the dashpot piston 62. The fluid in the portion of the dashpot cylinder 61 below the piston 62 is compressed and is forced to flow through the bypass formed through the piston by the passageway 96 and the bypass formed through the wall of the cylinder by the apertures 81, 82 and the central aperture 83 through the slide valve. Oil thus flows from the portion of the cylinder below the piston into the portion of the cylinder above the piston. As long as the pressure on the piston 62 does not exceed a certain value, the slide valve remains open and the combined areas of the passageways by which fluid bypasses through and around the piston are sufficient to allow the piston to descend at a rate determined by the setting of the needle valve 98 which is adjusted dependent on the allowable pressure rise in the penstock. As long as the turbine gate moves at a rate equal to or less than the rate of the fluid flow through the bypasses, cylinder 61, lever 72 and rod 73 remain stationary and the valve 101 remains seated in the position shown thus continuing supply of fluid pressure below the piston 57 which retains relief valve 51 in seated position and prevents wastage of water to the tailrace.

Rapid closing of the turbine gate 14 causes rapid movement of push rod 49 to the left which, through bell crank 71, exerts a heavy downward force on the dashpot piston 62 tending to force the piston to move quickly toward the bottom of the cylinder 61 but, because the cylinder is urged upwardly by the spring 66, downward movement of the cylinder 61 itself is modified or limited. A pressure is thus produced in the oil below the piston 62 which pressure acts through the aperture adjacent the spring 84, moving the slide valve 83 upwardly to reduce the free area or to close the aperture 82. The pressure thus produced in the dashpot cylinder 61 causes the cylinder to move downwardly compressing the spring 66. Further downward movement of dashpot cylinder 61 and further compression of spring 66 causes engagement of the extension 63 on the bottom of the dashpot cylinder with the plate 64 thus forming a mechanical connection with the piston 57 which would tend to force the valve 51 open. Such engagement of the bottom of the cylinder 61 with the piston 57 however does not take place excepting when other portions of the structure fail to perform their function. The initial downward movement of the dashpot cylinder 61 moves floating lever 72 which causes push rod 73 to be lifted, lever 78 and link 79 then forming a fixed pivot, thereby causing movement, as is explained hereinafter, of the control valve body 101 into position to shut off the supply conduit 44 and to open the discharge conduit 46. Fluid pressure under the piston 57 is then discharged and the valve 51 is opened due to the pressure of the fluid in the penstock acting on the top of the valve 51. Downward movement of the piston 57 moves the rod 76 and changes the position of the lever 78 which tends to move rod 73 downward to again cause valve 101 to close off the discharge 46 and to reopen the supply conduit 44 by which fluid pressure is admitted to the underside of the piston 57, but when movement of the push rod 49 ceases the spring 66 tends to expand and to raise the dashpot cylinder 61. Expansion of the spring 66 thus tends to restore the floating lever 72 to its original position and exerts a downward movement, through the push rod 73, on the valve body 101. Valve 101 then closes off the discharge conduit 46 and connects the supply conduit 44 to the underside of the piston 57. Such pressure compresses the spring 66 and tends to force the dashpot cylinder 61 upwardly at a rate determined by the flow of fluid through the piston bypass 96. Upward movement of the cylinder 61 continues until the pressures are balanced on each surface of the piston 62 whereupon spring 84 may expand and move slide valve 83 upwardly to reopen the port 81 and the stem 87 of the slide valve again rises into contact with the adjustable rocker arm 91.

Upward movement of the valve piston 57 also moves rod 76 upwardly thus changing the position of lever 78 which compensates for movement of other portions of the structure to restore the original relation between the floating lever 72 and lever 78 and to restore valve body 101 to its original position.

Consideration of the structure of control valve 43 will show that the force transmitted to the valve by the push rod 73 is merely a control force and is not a force of such magnitude as would be sufficient to close the valve against the pressure in the supply conduit 44. Rod 73 merely moves a pilot valve 111 which opens or closes the port 115 between the chambers 108 and 109.

As shown in Fig. 4, valve 111 is open and fluid under pressure flows through the ports in the piston 103 and fills spaces 109, 108, and 110. Pressure on both sides of the piston 103 is thus balanced and the valve body 101 remains in its lowermost position as shown. When the push rod 73 is moved upwardly, the port 115 is shut off from the fluid pressure and the fluid in spaces 109 and 110 drains off through the space 107 and discharges through conduit 113 into the discharge conduit 46. Continued pressure below the piston 103 then raises the valve body 101 which shuts off the supply conduit 44 and connects the discharge conduit 46 with the space underneath the relief valve piston 57 and valve 51 moves down as previously described. Rod 73 then is moved downward and depresses valve 111 closing off the ports into chamber 107 and opening communication of the space 110, through the port 115, with the space below the piston 103 and the fluid pressure in the supply conduit 44 so that the pressures above and below the piston 103 are again balanced and valve 101 is moved into its lowermost position as shown thus again shutting off the discharge and connecting the supply with the underside of the relief valve piston 57.

When the turbine gate 19 is being rapidly closed thus causing pressure relief valve 51 to be opened, water is being discharged through the turbine and through the pressure regulator. If the gate 19 remained stationary the valve 51 would be gradually closed by reason of the dashpot action so that only the partial discharge through the turbine would continue. However if the load on the turbine causes a decrease in turbine speed thus causing the governor to further open the gates, flow through the penstock is accelerated. In such case however movement of the rod 49 to the right recommences and tends to lift piston 62 quickly. The rate of movement of rod 49, when the gate 19 is opened without restriction by the dashpot, is however adjusted by the governor or servo motor actuating the turbine gate to avoid undesirable pressure decreases in the penstock due to acceleration in the flow. Lifting of piston 62 produces pressures on the top of the piston and the slide valve 83 is closed, allowing piston 62 to lift at a rate determined by the setting of the needle valve 98 and tending to lift the cylinder 61. Spring 66, forming a portion of the limited clearance coupling previously described, having been compressed by previous opening of the valve 51 now expands thus lifting cylinder 61 which causes the control valve 43 to drop thereby admitting fluid pressure under the relief valve piston 57 which closes the relief valve 51 at the rate at which the dashpot piston 62 is raised due to the motion of the rod 49 and at the rate of the leakage of the fluid between opposite sides of the piston 62 through the needle valve 98. Expansion of the spring 66, lifting of the cylinder 61, movement of the compensating device which impels movement of the floating lever 72, lowering of the rod 73 and raising of the piston 62 continue until all portions of the regulator structure are in the position shown in the drawings.

Having considered the operation of the structure disclosed when the turbine gate is closing, the conditions and operation of the several portions of the regulator will now be considered when the turbine gate is opening. When the turbine gate is slowly opening and the relief valve 51 is closed, push rod 49 moves toward the right and rotates bell crank 71 to tend to lift the dashpot piston 62. The pressure on both sides of the piston 62 being balanced in the rest position of the regulator, slow opening of the gate does not produce an over pressure and the by-pass formed by the apertures 81 and 82 and the slide valve 83 therefore remains open and the combined area of the passageways between the top and the bottom of the piston is sufficient to bypass all of the fluid within the cylinder 61 at a rate which permits piston 62 to move slowly upwardly without materially retarding the movement of the rod 49. The rate of fluid flow between the two portions of the cylinder is of course dependent on the setting of the slide valve 83 and the force of the spring 84 as well as on the setting of the needle valve 98.

In addition to the above described normal conditions of operation of the regulator, emergency conditions may also arise when the relief valve 51 is off its seat and is sticking. Such sticking may occur either when the turbine gate is opening and the relief valve is closing or when the turbine gate is closing and the relief valve is opening. When the turbine gate is opening and the relief valve is closing, the push rod 49 will be moving toward the right, the piston of the dashpot 62 will be lifting, spring 66 of the limited clearance coupling will be expanding and the dashpot cylinder 61 will be rising and valve 101 will have been moved into the position shown in the drawings to connect the supply conduit 44 and to disconnect the discharge conduit 46 from the under side of the relief valve piston 57. Sticking of the valve interrupts expansion of the spring 66 and raising of the cylinder 61. Continued movement toward the right of the push rod 49 and the resulting tendency to lift the dashpot piston 62 quickly produces an over pressure on the top of the piston 62 which causes closing of aperture 81 by the slide valve 83 by leakage as above explained, thus checking movement of the piston 62 in cylinder 61 and of the rod 49. The rod 49 being connected with the servo-motor 36 operating the turbine gate and controlled by the speed governor of the turbine, imposes an additional duty on the servo-motor thereby retarding further opening of the gate until the valve 51 completes its closing movement.

In the other emergency condition when the turbine gate is closing and the relief valve 51 is opening, the rod 49 will be moving toward the left and tending to depress dashpot piston 62, cylinder 61 will be depressed and spring 66 will be compressed. Valve 101 will have been previously moved into position to disconnect the supply conduit 44 and to connect the discharge conduit 46 to the space beneath the relief valve piston 57. Sticking of the valve 51 will further compress the spring 66 upon further downward movement of the cylinder 61 with the piston 62 until the cylinder abuts against the piston 57 and tends to force the same downwardly. Continued movement of the push rod 49 further depresses the piston 62 which produces an over pressure in the lower portion of the cylinder and shuts off the aperture 82 as above described. Piston 62 then delays movement of the rod 49 and hence of the servo-motor 36 until the piston 62 is forced in the lowermost position in the cylinder and forces valve 51 to move.

It will be seen from the above that each of the elements combining to form the regulator structure is so constructed as to perform one or more functions. Thus the relief valve 41 comprising the valve housing 410 with the valve seat 52, the valve body 51 and the piston 57 operating in the cylinder 58 is connected with the penstock and the tailrace to bypass water around the turbine in response to variations in the turbine gate opening and hence in response to variations in the penstock pressure thus preventing excessive pressure variation therein due to rapid acceleration or deceleration of the flow. The hydraulic control and restoring mechanism for the relief valve includes the valve 43 controlling the supply of pressure to and the discharge of pressure from the relief valve piston 57. The valve 43 is itself so constructed as to require only a very slight control force and movement to operate and to restore valve 101 to its previous position. Such restoring mechanism includes the rod 73, the floating lever 72 and the lever 78 which is fixedly pivoted at one end and pivoted to the relief valve piston 57 at the other end. The ratio of the levers 72 and 78 is such that, when the piston 57 and the cylinder 61 move synchronously, the resultant movement is zero and the rod 73 does not move. Movement of the rod 73 is therefore due to relative movement of the piston 57 and the cylinder 61 which allows lost motion and hence delay in operation of the relief valve 51. The restoring or compensating mechanism is partially actuated by the dashpot which comprises the movable cylinder 61 containing the piston 62 and is provided with an emergency bypass 81, 82, 83 while piston 62 is provided with a manually adjustable bypass 96. The emergency bypass prevents dashpot resistance to the servo-motor 36 when the turbine gates are opening and the penstock flow is being accelerated. Whenever the relief valve 51 is seated, the emergency bypass is kept open thus allowing free dashpot action. The relief valve and the dashpot are connected by a limited clearance coupling which includes the cylindrical extension 63, the relief valve piston plate 64 and the spring 66 and which permits a definite maximum relative movement between the dashpot system and the valve system and prevents stalling of the servo-motor 36. The size of the servo-motor required is thus largely reduced due to the avoidance of direct mechanical couplings with the relief valve under normal conditions.

Figures 5, 6:
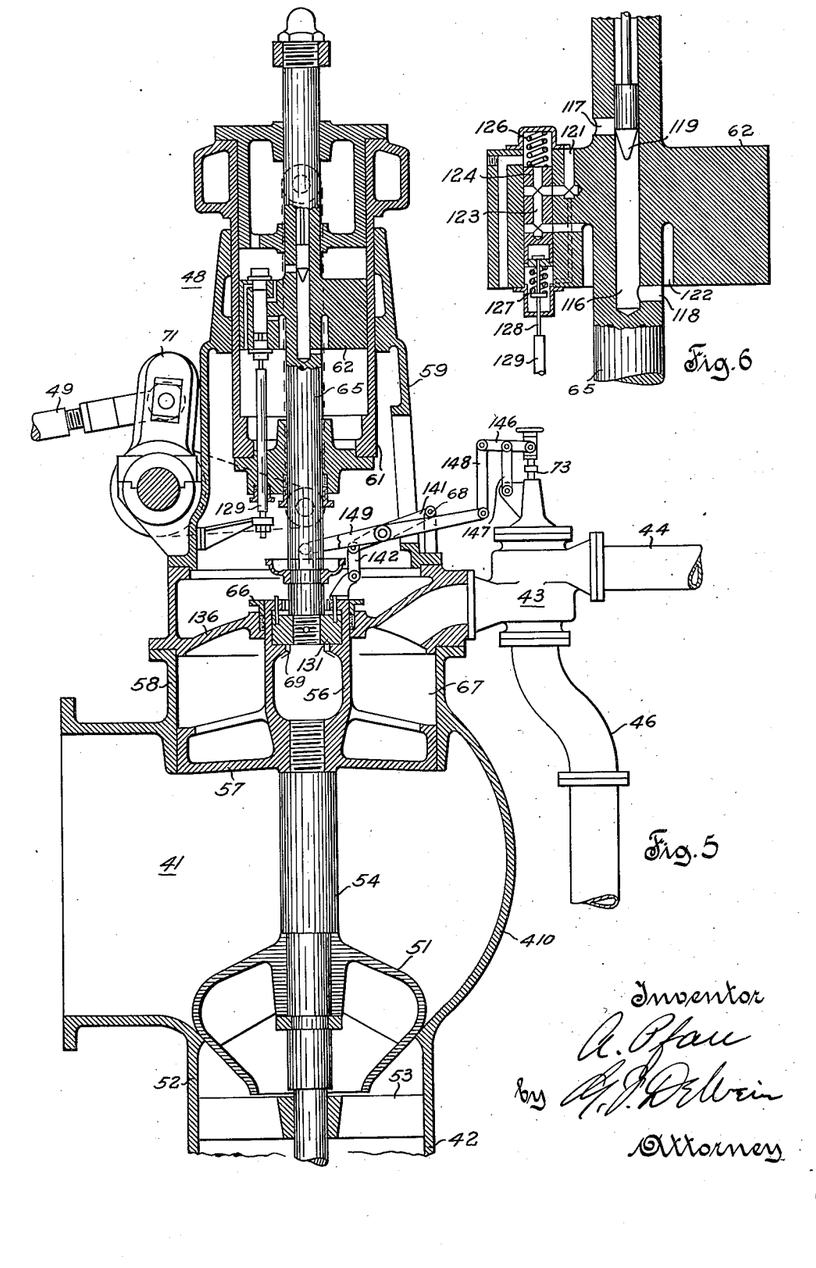
Fig. 5 illustrates a modified embodiment of a pressure regulator shown in vertical cross sectional view.
Fig. 6 is an enlarged vertical sectional view of the dashpot piston employed in the structure shown in Fig. 5.

In the modification of the pressure regulator as shown in Figs. 5 and 6, the regulator is again formed of several component sub-combinations similar to those described in Figs. 2 and 4. The relief valve 51 of Fig. 5 is similar to that of Fig. 2 excepting that the valve moves upwardly to open rather than downwardly. The dashpot 48 comprising elements 59, 61 and 62 differs from the dashpot of Fig. 2 in that the cylinder 61 is connected with the bell crank 71 and the push rod 49 and that both bypasses are formed through the piston 62 and that the stop for one of the bypasses differs from that of the previous construction. The limited clearance coupling is now placed within the upper portion of the valve stem extension 56 and the compensating leverage for operating the control valve 43 is quite different in appearance from that previously described due chiefly to reversal of the direction of movement of the relief valve 51. The control valve 43 itself is exactly like that shown in section in Fig. 4 and therefore requires no further description. Only the dashpot, the limited clearance coupling and the compensating leverage therefore will be specifically described hereinafter.

The dashpot piston 62 is formed with two bypasses to allow flow of fluid from one side of the piston to the other which permits movement of the piston under conditions which will be described hereinafter. One of the bypasses is formed by a passageway 116 through the piston and the piston rod with side apertures 117 and 118 through the piston rod to connect the passage 116 with the space within the cylinder above and below the piston respectively. Flow of fluid through the passageway 116 is controlled by a needle valve 119 which extends through the piston rod and is adjustable at the upper end thereof in any suitable manner. The other bypass is formed by passages 121 and 122 formed in the piston and connected by a passageway 123 extending longitudinally through a floating slide valve 124 reciprocable in a chamber formed in the piston 62. The position of the slide valve 124 is controlled by the degree of compression of a spring 126 abutting against one end of the valve and against a cap attached to the upper side of the piston and the degree of compression of a spring 127 abutting against the other end of the valve and a collar formed on a pin 128 loosely connected with the valve. The spring 127 together with the pin 128 forms a resilient coupling which, in some positions of the piston 62, abuts against an adjustable stop 129 mounted on the cylinder guide 59 and extending into the cylinder 61 through a suitable sealing gland.

The rod 65 of piston 62 extending downwardly through the bottom of the dashpot cylinder 61 through a suitable sealing gland is secured to a disk 131 embraced by the upper portion of the valve stem extension 56. The extension 56 passes upwardly through a suitable sealing gland 66 through a partition 136 which, together with the piston 57, defines a chamber 67 to which fluid pressure is supplied through the control valve 43.

The compensating leverage comprises a lever 141 connected at one end thereof with a fixed pivot 68 mounted on the cylinder guide 59 and connected at the other end thereof with a link 142 which is pivotally mounted on the valve stem extension 56. The push rod 73 is operated by a lever 146 which is connected with the rod and is mounted on a link 147 pivoted on the casing of the control valve 43. The other end of the lever 146 is connected by link 148 with one end of the floating lever 149. The lever 149 is pivoted on lever 141 an is pivotally connected at the other end thereof with the rod 65 of piston 62. The ratio of the several levers forming the compensating leverage is the same as previously described and the operation of the leverage is also as already described and is not therefore repeated.

The operation of the pressure regulator disclosed in Fig. 5 will now be considered relative to the same conditions as were previously considered when discussing the operation of the regulator as disclosed in Fig. 2, namely, the conditions when the turbine gate is being slowly closed with the pressure regulator closed, when the gate is being rapidly closed, when the gate is being slowly opened while the valve 51 is closed as during starting, when the gate is being slowly opened while the valve 51 is still partially open and a load change then takes place, and the emergency condition when the valve 51 is off its seat and is sticking when the turbine gate is either opening or closing.

With a closed relief valve 51, when the gate 19 is slowly closing, the push rod 49 will be moving toward the left and the cylinder 61 will therefore be slowly lifted. Pressure is produced below the piston 62 but is of such low degree only as will allow both bypass 116 and bypass 121, 122, 123 to remain open. The piston 62 of the dashpot therefore remains stationary and the floating lever 149 accordingly also remains stationary. The valve 43 controlling the supply of fluid pressure to the relief valve 57 being in the closed position remains closed and the pressure supply to the upper surface of the piston 57 is continued which retains the valve 51 in the closed position. The column of water in the penstock is accordingly decelerated at such rate as is required to reduce the supply water to the turbine in quantities determined by the rate of gate closing. Such decelerations are not of such order as to cause the formation of pressure rises in the penstock which might be dangerous. It is therefore unnecessary and undesirable that the valve 51 take any part in the controlling action when the gate is closed at a slow rate.

When the gate is rapidly closed with the relief valve 51 in the closed position it is desired that the over pressures otherwise produced in the penstock due to retardation of the moving column of the water be relieved by opening of the valve 51. During rapid closing action of the gate the push rod 49 will be moving toward the left at the rate of gate closing action and the cylinder 61 will be lifted rapidly. A high pressure is therefore developed below the piston 62 and the bypass 121, 122, 123 is accordingly closed. The area of the bypass 116 not being sufficient to allow for substantial equalization of the pressure on both sides of the piston, the piston 62 lifts and therefore lifts the floating lever 149. The valve 43 is accordingly opened to shut off the supply of pressure through conduit 44 to the chamber 67 above the piston 57 and to allow discharge of such pressure therefrom through the conduit 46. The pressure in the spiral casing accordingly lifts the piston 57 of the valve 51 and allows discharge of pressure through the tube 42 to the tailrace 9. The compensating leverage then operates to reclose valve 43 and hence to cause the supply of pressure to the upper surfaces of piston 57 which again closes the valve 51. It is to be understood of course that closing action of the valve 51 cannot take place unless the pressure in the spiral casing has been reduced to the value at which the pressure supplied through the conduit 44 may over-balance such spiral casing pressure.

When the valve 51 is closed and the turbine gate is to be slowly opened as in starting the turbine, the push rod 49 moves toward the right and depresses the cylinder 61 at a slow rate which produces a low pressure above the piston 62. Such pressure however, being low in value, both the bypasses 116 and 121, 122 and 123 remain open and the piston 62 remains substantially stationary. The floating lever 149 also accordingly remains stationary and the position of the valve 43 is not changed. Pressure is accordingly continued to be supplied through conduit 44 to the upper surfaces of the valve piston 57 and the valve 51 remains closed.

If the valve 51 is still partially opened and is closing and the gate 19 is reopening slowly, the push rod 49 will be moving toward the right and depressing cylinder 61 to produce a low pressure above the piston 62. Both bypasses through the piston will, however, remain open and the piston will remain substantially stationary or will be only slightly depressed relative to the cylinder. The floating lever 149 however will be moved due to the closing operation of the valve 51 and the valve 43 accordingly will be closing. If a sudden load increase now takes place during the above operation and is of sufficient intensity to cause a change in the rate of operation in the elements above indicated as being moving, the movement of such elements is accelerated and the rod 65 of the piston 62 is pushed downwardly due to the increase of pressure above such piston and the consequent closing of the bypass 121, 122, 123. The piston 62 accordingly is depressed and forces disk 131 downwardly against the flange within the valve stem extension 56 thus producing a positive connection between the valve 51 and the piston 62. A force is accordingly exerted on the valve 51 through the dashpot from the servo-motor operating the push rod 49 until the valve 51 is closed. Equilibrium pressure conditions in the dashpot are then reestablished. If the load change is a sudden decrease, rod 49 will reverse its direction of movement from right to left and will raise cylinder 61 to produce a high pressure below the piston 62. The bypass 121, 122, 123, accordingly closes and the piston 62 is forced to rise due to the pressure in the cylinder. The floating lever 149 is accordingly raised which opens valve 43 and allows the pressure to discharge from above the piston 57. The spiral casing pressure accordingly lifts the piston 57 and opens the valve 51 to allow wastage of water through the valve which prevents excessive pressure rises in the penstock due to a sudden change in the quantity of water flowing through the penstock resulting from the closure of the turbine gate.

If the turbine gate is opening and the relief valve is closing and sticks during such closing operation, the operation and position of the regulator elements will be as follows. During the normal operation of the regulator when the gate is opening and the valve is closing the push rod 49 will be moving toward the right depressing the cylinder 61 and producing a pressure above the piston 62. The piston 62 will accordingly be depressed thereby moving floating lever 149 downwardly and tending to close valve 43. Such closing of the valve 43 again closes off the discharge conduit 46 and opens the supply conduit 44 to supply fluid pressure above the piston 57 which is accordingly forced downwardly thereby closing valve 51. Even though the valve 51 or the piston 57 sticks in any intermediate position for any reason, downward movement of the dashpot piston 62 is continued and the disk 131 is forced downwardly against the internal stops 69 of the valve stem extension 56. A positive force is accordingly exerted on the valve 51 from the servo-motor 36 and the valve is forced downwardly against its seat. If the resistance of the valve 51 to moving is sufficiently great, the servo-motor action is retarded and opening of the gate is delayed.

In another emergency condition when the gate is closing while the valve 51 is opening and when the valve sticks, the normal operation of the elements of the regulator are as follows. The push rod 49 will be moving toward the left raising the cylinder 61 and producing a pressure below the piston 62. The piston 62 accordingly will be lifted and will lift floating lever 149 which opens valve 43. Such opening of the valve shuts off the supply of pressure to chamber 67 and allows discharge of the pressure therefrom whereupon the spiral casing pressure will be sufficient to lift the piston 57 and the relief valve 51. If the valve 51 and the piston 57 should stick for any reason, the continued upward movement of the piston 62 lifts the disk 131 into engagement with the upper internal flange of the valve stem extension 56 and produces a positive connection which tends to pull the valve upwardly upon continued movement of the piston. If the valve sticks sufficiently to resist such upward movement the action of the servo-motor 36 is delayed and opening of the turbine gate 19 is retarded.

The functions of the several sub-combinations entering into the pressure regulator structure as a whole are similar to those previously mentioned relative to the first embodiment of the pressure regulator described. It is accordingly believed that a statement of the functions of the several portions of the structure need not be repeated and that such functions will be clearly understood by reference to the preceding modification of the present invention.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. A regulator for limiting pressure variations in the flow of fluid to a hydraulic turbine and comprising a fluid pressure operated relief valve, a fluid pressure operated valve controlling the flow of fluid to said relief valve, a dashpot actuated in response to variations in quantity of fluid flowing through the turbine, means connecting said control valve with said dashpot and with said relief valve and compensating for the relative movement between said relief valve and said dashpot, and a double acting pilot valve operated by said dashpot and said pressure limiting valve for regulating the operation of said control valve.

2. A regulator for limiting pressure variations in the flow of fluid to a hydraulic turbine and comprising a fluid pressure operated relief valve, a fluid pressure operated valve controlling the flow of fluid to said relief valve, a dashpot actuated in response to variations in quantity of fluid supplied to the turbine, a system of levers connecting said control valve with said dashpot and with said relief valve and compensating for the relative movements between said relief valve and said dashpot, the ratio of said levers producing substantially a zero resultant upon synchronous movement of said relief valve and said dashpot, and a double acting pilot valve operated by said dashpot and said pressure limiting valve for regulating the operation of said control valve.

3. A regulator for limiting pressure variations in the flow of fluid to a hydraulic turbine and comprising a fluid pressure operated relief valve, a fluid pressure operated valve controlling the flow of fluid to said relief valve, said control valve being actuated upon movement of a piston valve therein controlling both inflow and outflow fluid passageways, a dashpot actuated in response to variations in quantity of fluid supplied to the turbine, and means connecting said control valve with said dashpot and with said relief valve and compensating for the relative movement between said relief valve and said dashpot.

4. A regulator for limiting pressure variations in the flow of fluid to a hydraulic turbine and comprising a fluid pressure operated relief valve, a fluid pressure operated valve controlling the flow of fluid to said relief valve, a dashpot actuated in response to variations in quantity of fluid flowing through the turbine, a pilot valve within said control valve for controlling both inflow and outflow fluid passageways, a system of levers connecting said pilot valve with said dashpot and with said relief valve and compensating for the relative movements between said relief valve and said dashpot, the ratio of said levers producing a substantially zero resultant upon synchronous movement of said relief valve and said dashpot, and means connecting said relief valve with said dashpot to provide a limited clearance coupling therebetween.

5. A regulator for limiting pressure variations in the flow of fluid to a hydraulic turbine and comprising a fluid pressure operated relief valve, a fluid pressure operated valve controlling the flow of fluid to said relief valve, a dashpot actuated in response to variations in quantity of fluid supplied to the turbine, said dashpot having a movable cylinder and a movable piston therein and having a normal fluid bypass and an emergency fluid bypass therein to vary the operation of said dashpot in either direction in response to variation in the flow of fluid through the turbine, and means connecting said control valve with said dashpot and with said relief valve and compensating for the relative movement between said relief valve and said dashpot.

6. A regulator for limiting pressure variations in the flow of fluid to a hydraulic turbine and comprising a fluid pressure operated relief valve, a fluid pressure operated valve controlling the flow of fluid to said relief valve, a dashpot actuated in response to variations in quantity of fluid flowing through the turbine, said dashpot having a movable cylinder and a movable piston therein and having a normal fluid bypass and an emergency fluid bypass therein to vary the operation of said dashpot in either direction in response to variation in the flow of fluid through the turbine, both of said bypasses being adjustable, means connecting said relief valve with said dashpot to provide a limited clearance coupling therebetween to limit relative longitudinal movement therebetween, and means connecting said control valve with said dashpot and with said relief valve and compensating for the relative movement between said relief valve and said dashpot.

7. A regulator for limiting pressure variations in the flow of fluid to a hydraulic turbine and comprising a relief valve, a valve controlling the flow of fluid to said relief valve, a dashpot having a bypass actuated in response to variations in the quantity of fluid flowing through the turbine, means connecting said control valve with said dashpot and with said relief valve and compensating for the relative movement of said relief valve and said dashpot acting upon said control valve, and means for retaining the bypass in a predetermined position during closed position of said relief valve.

8. A regulator for limiting pressure variations in a fluid flowing under pressure in a pipeline and comprising a fluid pressure operated relief valve, a dashpot connected with said relief valve, means responsive to conditions causing variations of pressure in the pipeline and controlling operation of said dashpot, a fluid pressure operated control valve controlling the supply of pressure to and the discharge of pressure from the means for operating said relief valve, and a pilot valve jointly operated by said relief valve and said dashpot to control operation of said control valve.

9. A regulator for limiting pressure variations in a fluid flowing under pressure in a pipeline and comprising a fluid pressure operated relief valve, a dashpot connected with said relief valve, means responsive to conditions causing variations of pressure in the pipeline and controlling operation of said dashpot, a fluid pressure operated control valve controlling the supply of pressure to and the discharge of pressure from the means for operating said relief valve, a pilot valve to control operation of said control valve, and means connecting said relief valve and said dashpot to compensate for relative movement therebetween and to operate said pilot valve.

10. A regulator for limiting pressure variations in a fluid flowing under pressure in a pipeline and comprising a fluid pressure operated relief valve, a dashpot arranged adjacent said relief valve, means connecting said relief valve and said dashpot to allow limited relative movement therebetween and to cause positive connection therebetween under predetermined conditions, means responsive to conditions causing variations of pressure in the pipeline and controlling operation of said dashpot, and a fluid pressure operated valve controlled jointly by operation of said relief valve and of said dashpot to control supply of pressure to and discharge of pressure from the pressure actuated means for operating said relief valve.

ARNOLD PFAU.